United States Patent
Zhang et al.

(10) Patent No.: US 8,983,952 B1
(45) Date of Patent: Mar. 17, 2015

(54) SYSTEM AND METHOD FOR PARTITIONING BACKUP DATA STREAMS IN A DEDUPLICATION BASED STORAGE SYSTEM

(75) Inventors: Xianbo Zhang, Madison, WI (US); Emery Wang, Saint Paul, MN (US); David Teater, Minneapolis, MN (US); James P. Ohr, Saint Paul, MN (US)

(73) Assignee: Symantec Corporation, Mountain View, CA (US)

( * ) Notice: Subject to any disclaimer, the term of this patent is extended or adjusted under 35 U.S.C. 154(b) by 192 days.

(21) Appl. No.: 12/846,132

(22) Filed: Jul. 29, 2010

(51) Int. Cl.
G06F 7/00 (2006.01)

(52) U.S. Cl.
USPC ........................................... 707/736

(58) Field of Classification Search
USPC ............ 707/608, 687, 999.101, 999.102, 736
See application file for complete search history.

(56) References Cited

U.S. PATENT DOCUMENTS

| | | | |
|---|---|---|---|
| 5,276,860 A | 1/1994 | Fortier et al. |
| 5,535,381 A | 7/1996 | Kopper |
| 5,555,371 A | 9/1996 | Duyanovich et al. |
| 5,559,991 A | 9/1996 | Kanfi |
| 5,561,421 A | 10/1996 | Smith |
| 5,835,953 A | 11/1998 | Ohran |
| 5,990,810 A | 11/1999 | Williams |
| 5,991,542 A | 11/1999 | Han et al. |
| 6,014,676 A | 1/2000 | McClain |
| 6,029,168 A | 2/2000 | Frey |
| 6,085,298 A | 7/2000 | Ohran |
| 6,101,585 A | 8/2000 | Brown et al. |
| 6,141,784 A | 10/2000 | Davis |
| 6,360,330 B1 | 3/2002 | Mutalik et al. |
| 6,389,433 B1 | 5/2002 | Bolosky et al. |
| 6,513,051 B1 | 1/2003 | Bolosky et al. |
| 6,542,962 B2 | 4/2003 | Kodama et al. |
| 6,640,278 B1 | 10/2003 | Nolan et al. |
| 6,665,815 B1 | 12/2003 | Goldstein et al. |
| 6,714,952 B2 | 3/2004 | Dunham et al. |
| 6,785,786 B1 | 8/2004 | Gold et al. |
| 6,829,688 B2 | 12/2004 | Grubbs et al. |
| 6,847,983 B2 | 1/2005 | Somalwar et al. |

(Continued)

FOREIGN PATENT DOCUMENTS

EP 838758 4/1998

OTHER PUBLICATIONS

U.S. Appl. No. 11/404,105 entitled Routing, filed Apr. 13, 2006.

(Continued)

*Primary Examiner* — Eliyah S Harper
(74) *Attorney, Agent, or Firm* — Rory D. Rankin; Meyertons, Hood, Kivlin, Kowert & Goetzel, P.C.

(57) ABSTRACT

A system and method for partitioning a data stream into a plurality of segments of varying sizes. A data stream manager partitions a received data stream into segments which are then conveyed to a deduplication engine for processing. The data stream received by the data stream manager includes metadata corresponding to the data stream. Based upon the metadata, which may include an indication as to a type of data included in the data stream, the data stream is partitioned into segments for further processing. A size of a segment used for partitioning given data is based at least in part on a type of data being partitioned. The variable segment sizes may be chosen to balance between maximizing the deduplication ratio and minimizing both the segment count and the size of the fingerprint index.

17 Claims, 9 Drawing Sheets

(56) References Cited

U.S. PATENT DOCUMENTS

| | | | |
|---|---|---|---|
| 6,865,655 | B1 | 3/2005 | Andersen |
| 6,880,051 | B2 | 4/2005 | Timpanaro-Perrotta |
| 6,910,112 | B2 | 6/2005 | Berkowitz et al. |
| 6,920,537 | B2 | 7/2005 | Ofek et al. |
| 6,938,135 | B1 | 8/2005 | Kekre et al. |
| 6,976,039 | B2 | 12/2005 | Chefalas et al. |
| 6,983,365 | B1 | 1/2006 | Douceur et al. |
| 7,055,008 | B2 | 5/2006 | Niles et al. |
| 7,136,976 | B2 | 11/2006 | Saika |
| 7,146,429 | B2 | 12/2006 | Michel |
| 7,200,604 | B2 | 4/2007 | Forman et al. |
| 7,213,158 | B2 | 5/2007 | Bantz et al. |
| 7,257,104 | B2 | 8/2007 | Shitama |
| 7,257,643 | B2 | 8/2007 | Mathew |
| 7,310,644 | B2 | 12/2007 | Adya et al. |
| 7,318,072 | B2 | 1/2008 | Margolus |
| 7,359,920 | B1 | 4/2008 | Rybicki et al. |
| 7,389,394 | B1 | 6/2008 | Karr |
| 7,401,194 | B2 | 7/2008 | Jewell |
| 7,409,523 | B2 | 8/2008 | Pudipeddi |
| 7,424,514 | B2 | 9/2008 | Noble et al. |
| 7,454,592 | B1 | 11/2008 | Shah |
| 7,478,113 | B1 | 1/2009 | De Spiegeleer et al. |
| 7,529,785 | B1 | 5/2009 | Spertus et al. |
| 7,661,121 | B2* | 2/2010 | Smith et al. ............ 725/135 |
| 8,315,985 | B1 | 11/2012 | Ohr et al. |
| 8,655,939 | B2* | 2/2014 | Redlich et al. ........... 709/201 |
| 2001/0045962 | A1 | 11/2001 | Lee |
| 2002/0049718 | A1* | 4/2002 | Kleiman et al. ............ 707/1 |
| 2002/0107877 | A1 | 8/2002 | Whiting et al. |
| 2003/0163495 | A1 | 8/2003 | Lanzatella et al. |
| 2003/0177149 | A1 | 9/2003 | Coombs |
| 2004/0044707 | A1 | 3/2004 | Richard |
| 2004/0143731 | A1 | 7/2004 | Audebert et al. |
| 2004/0268068 | A1 | 12/2004 | Curran et al. |
| 2005/0027766 | A1 | 2/2005 | Ben |
| 2005/0198328 | A1 | 9/2005 | Lee et al. |
| 2005/0204108 | A1 | 9/2005 | Ofek |
| 2005/0216788 | A1 | 9/2005 | Mani-Meitav et al. |
| 2005/0216813 | A1 | 9/2005 | Cutts et al. |
| 2006/0008256 | A1* | 1/2006 | Khedouri et al. ............ 386/124 |
| 2006/0026219 | A1 | 2/2006 | Orenstein et al. |
| 2006/0184587 | A1* | 8/2006 | Federwisch et al. .......... 707/200 |
| 2006/0271540 | A1 | 11/2006 | Williams |
| 2007/0016560 | A1* | 1/2007 | Gu et al. ............ 707/3 |
| 2007/0083491 | A1* | 4/2007 | Walmsley et al. ............ 707/3 |
| 2007/0192548 | A1 | 8/2007 | Williams |
| 2007/0198659 | A1 | 8/2007 | Lam |
| 2007/0250674 | A1 | 10/2007 | Fineberg et al. |
| 2008/0005141 | A1 | 1/2008 | Zheng et al. |
| 2008/0133561 | A1 | 6/2008 | Dubnicki et al. |
| 2008/0154989 | A1 | 6/2008 | Arman |
| 2008/0177799 | A1* | 7/2008 | Wilson ............ 707/200 |
| 2008/0228939 | A1 | 9/2008 | Samuels et al. |
| 2008/0243769 | A1 | 10/2008 | Arbour et al. |
| 2008/0243953 | A1 | 10/2008 | Wu et al. |
| 2008/0244204 | A1 | 10/2008 | Cremelie et al. |
| 2008/0313207 | A1* | 12/2008 | Modad et al. ............ 707/102 |
| 2009/0228520 | A1* | 9/2009 | Yahata et al. ............ 707/104.1 |
| 2009/0313248 | A1* | 12/2009 | Balachandran et al. ............ 707/6 |
| 2010/0082695 | A1* | 4/2010 | Hardt ............ 707/798 |
| 2010/0083003 | A1 | 4/2010 | Spackman |
| 2010/0146013 | A1* | 6/2010 | Mather ............ 707/803 |
| 2010/0250896 | A1* | 9/2010 | Matze ............ 711/216 |
| 2010/0257403 | A1 | 10/2010 | Virk et al. |
| 2010/0274982 | A1 | 10/2010 | Mehr et al. |
| 2010/0332452 | A1 | 12/2010 | Hsu et al. |

OTHER PUBLICATIONS

U.S. Appl. No. 11/403,379 entitled Parallel Backup, filed Apr. 13, 2006.

U.S. Appl. No. 11/641,389, filed Dec. 18, 2006 entitled "Single Instance Storage".

"Windows DDK Glossary," http://msdn.microsoft.com/library/default.asp?url=/library/en-us/gloss/hh-         /gloss/glossary.sub.--628b1dfc-c8f0-4143-a4ef-0dddae24be4b.xml.asp, (3 pages).

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," Veritas Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management—Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

\* cited by examiner

| File Type | Segment Size |
|---|---|
| Word Processing Document 310 | 128 KB |
| Spreadsheet 320 | 16 KB |
| Operating System File 330 | 64 KB |
| MPEG 340 | 16 MB |
| MP3 350 | 16 MB |
| JPEG 360 | 16 MB |
| Database 370 | 8 KB |
| Other 380 | 128 KB |

SYSTEM AND METHOD FOR PARTITIONING BACKUP DATA STREAMS IN A DEDUPLICATION BASED STORAGE SYSTEM

BACKGROUND OF THE INVENTION

1. Field of the Invention

The present invention described herein relates generally to storage systems, and in particular to those systems using data deduplication methods to reduce storage utilization.

2. Description of the Related Art

A common goal of most storage systems is to reduce the storage of duplicate data. One technique used to attain this goal is referred to as "deduplication". Deduplication is a process whereby redundant copies of the same file or file segments within a storage system are deleted. In this manner, a single instance of a given file segment (or other portion of data) is maintained. Such an approach is often referred to as single instance storage.

The advantage of deduplication is simple; it reduces storage consumption by only storing unique data. In a typical storage system, it is common to find duplicate occurrences of individual blocks of data in separate locations. Duplication of data blocks may occur when, for example, two or more files share common data or where a given set of data occurs at multiple places within an individual file. With the use of deduplication, however, only a single copy of a file segment is written to the storage medium, thereby reducing memory consumption.

The process of data deduplication is often utilized in backup storage applications. Backup applications generally benefit the most from deduplication due to the requirement for recurrent backups of an existing file system. Typically, most of the files within the file system will not change between consecutive backups, and therefore do not need to be stored.

When a backup data stream is received by a storage system, the data stream is generally partitioned into segments. After partitioning, a fingerprint or other unique identifier is generated from each data segment. The fingerprint of each new data segment is compared to an index of fingerprints created from previously stored data segments. If a match between fingerprints is found, then the newly received data segment may be identical to one already stored in the storage system (i.e., represents redundant data). Therefore, rather than storing the new data segment, this data segment is discarded and a reference pointer is inserted in its place which identifies the location of the identical data segment in the backup data storage system. On the other hand, if the fingerprint does not have a match in the index, then the new data segment is not already stored in the storage system. Therefore, the new fingerprint is added to the index, and the new data segment is stored in the backup storage system.

In a typical deduplication based storage system, the input data stream is partitioned into fixed size segments following the exact sequence of the contiguous data stream. One drawback of this approach is that it fails to eliminate many redundant segments if the alignment between consecutive backup data streams is slightly different. For example, as noted above, when a single machine performs a backup of a given storage system snapshot, most of the data being sent to the backup storage medium will be unchanged from the previous snapshot. However, any individual file modification or deletion within the snapshot image may shift segment boundaries and result in the creation of a totally different set of segments. Consequently, many segments for a given file will not be identical to previous segments for the file—even though most of the data for the file remains unchanged.

Another drawback with current approaches to deduplication is the strain put on system resources from managing a large number of stored segments and managing the deduplication process. If maximizing the deduplication ratio were the only goal, then choosing a smaller segment size to partition the backup data stream may achieve this goal. However, with a smaller segment size, the number of segments and the fingerprint index may grow too large to be easily managed. For example, as the size of the fingerprint index grows, eventually the index may exceed the size of the available physical memory. When this happens, portions of the index must be stored on disk, resulting in a slowdown in reads and writes to the index, and causing overall sluggish performance of the deduplication process. Additionally, when portions of the index are stored on disk, the task of searching for a fingerprint match will often be the bottleneck delaying the deduplication process. Ideally, the entire fingerprint index is stored in physical memory, and to accomplish this, additional techniques are needed to keep the size of the index relatively small while still achieving a high deduplication ratio. Also, generating fingerprints utilizes valuable processing resources. Thus, reducing the number of fingerprints generated may also decrease the burden on the processing and memory resources of the deduplication storage system.

In view of the above, improved methods and mechanisms for managing deduplication of data are desired.

SUMMARY OF THE INVENTION

Various embodiments of methods and mechanisms for managing deduplication of data are contemplated. In one embodiment, a data stream manager of a deduplication system is coupled to receive a data stream for storage in a storage system. In addition to receiving the data stream, metadata corresponding to the data stream is also received. The data stream manager analyzes the metadata for the data stream and makes decision regarding how the data stream is to be partitioned based upon the metadata. In various embodiments, the data stream manager partitions the backup data stream into variable sized segments; smaller segments may be used when there is a higher probability of deduplication, and larger segments may be used when there is a lower probability of deduplication.

Also contemplated is a data stream manager coupled to receive a backup data stream and corresponding metadata from a client. In one embodiment, the metadata describes attributes of the data contained within the backup data stream. Such attributes may include an indication as to a type of data included within the data stream. As the data stream manager processes the data stream, it partitions the data stream into segments of various sizes. The choice of segment size may be based at least in part on the type of data included within the data stream.

Also contemplated are embodiments wherein the metadata contains an extent mapping of the data stream. The data stream manager may use this extent mapping to locate file boundaries within the data stream. Other embodiments may utilize other data to identify file boundaries. The data stream manager may then partition the data stream into segments aligned with the file boundaries. Segments of variable sizes may be created in order to align subsequent segments with a file boundary.

These and other features and advantages will become apparent to those of ordinary skill in the art in view of the following detailed descriptions of the embodiments of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, signals, computer program instructions, and techniques have not been shown in detail to avoid obscuring the approaches described herein.

Figure 1:
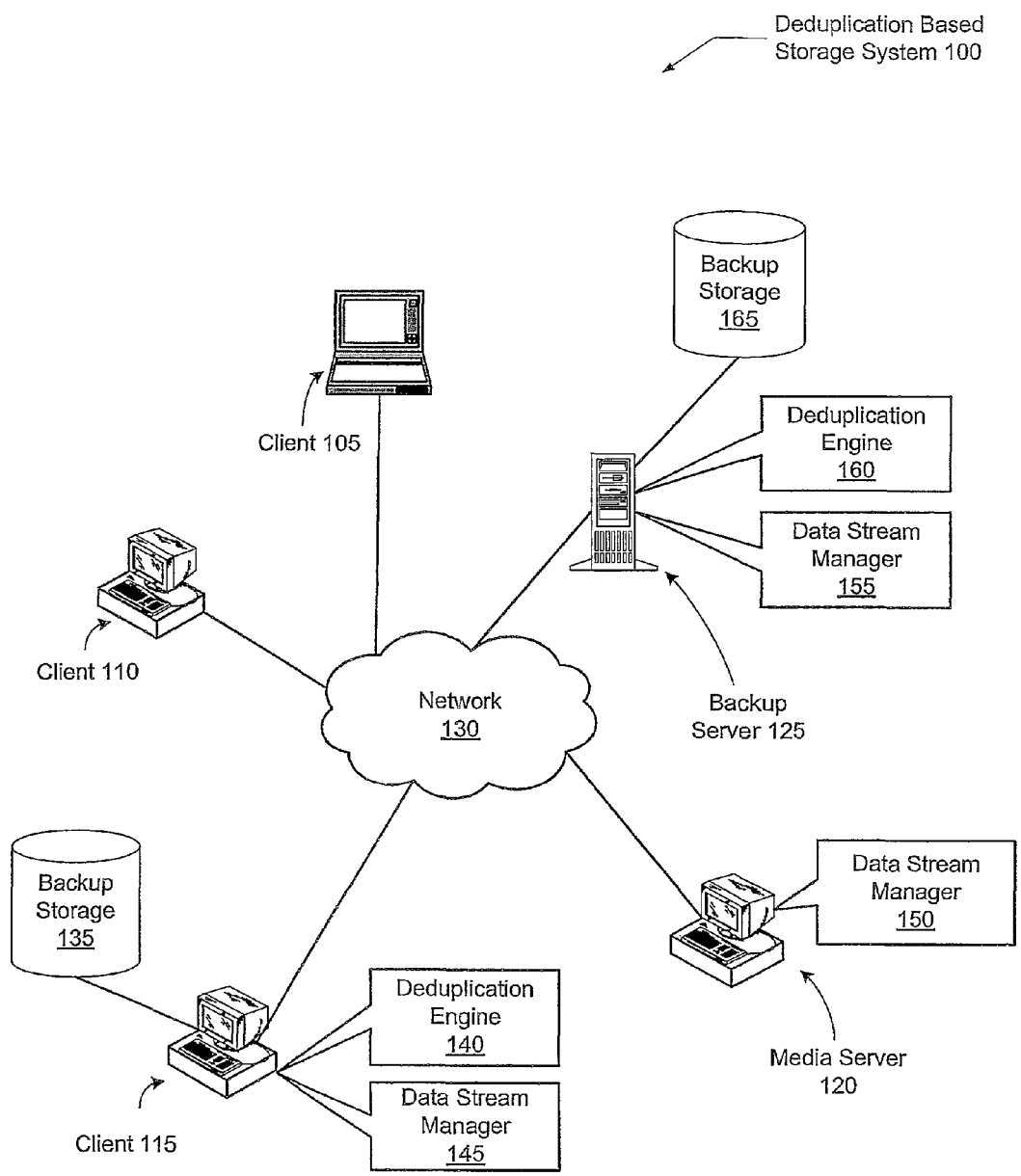
FIG. 1 illustrates one embodiment of a deduplication based storage system.

FIG. 1 illustrates a network combining three different types of deduplication storage systems; these three different types are client, in-line, and target deduplication. These network topologies and configurations are shown to illustrate a variety of possible approaches. Other network topologies and configurations are possible and are contemplated as well. Embodiments of the methods and mechanisms described herein may be used in any single type of deduplication system or combination thereof. The deduplication based storage system 100 includes clients 105, 110 and 115 that are representative of any number of mobile or stationary clients. While this figure shows the examples of two desktop computers and a laptop computer as clients, other client devices including personal digital assistants, cell phones, wireless reading devices, and any other types of electronic devices capable of sending and receiving data are possible and are contemplated. As shown in FIG. 1, the clients are connected to a network 130 through which they are also connected to a media server 120 and a backup server 125. The backup server 125 is also connected to backup storage 165, where data from clients 105 and 110 may be stored. Backup storage 165 may include one or more data storage devices of varying types, such as hard disk drives, optical drives, magnetic tape drives, and others. The data stream managers 145, 150, and 155 are software and/or hardware mechanisms on the client 115, media server 120, and backup server 125, respectively. Each data stream manager partitions an input data stream received from a client into segments. The deduplication engines 140 and 160 are also software and/or hardware mechanisms on the client 115 and the backup server 125, respectively. Each deduplication engine may be configured to perform one or more of the following: generating fingerprints (which could be a hash or otherwise) for the data segments, maintaining a fingerprint index to store fingerprints from stored data segments, searching the index for fingerprint matches, and deleting redundant data segments.

One or more of the clients on the primary network 130 may also function as a server to a network of other clients. The approaches described herein can be utilized in a variety of networks, including combinations of local area networks (LANs), such as Ethernet networks or Wi-Fi networks, and wide area networks (WANs), such as the Internet, cellular data networks, and other data communication networks. The networks served by the approaches described herein may also have a plurality of backup storage media, depending on the unique storage and backup requirements of each specific network. Storage media may be implemented in accordance with a variety of storage architectures including, but not limited to, a network-attached storage environment, a storage area network (SAN), and a disk assembly directly attached to a client or host computer.

It is also noted that while the following discussion will generally refer to backups and/or backup data, embodiments of the methods and mechanisms described herein may be utilized in association with data that is not part of a backup. For example, the approaches described herein may be used in conjunction with a live/working data store or otherwise.

The media server 120 may be used as part of an in-line deduplication system. An in-line deduplication system may also include clients 105 and 110 that are representative of any number of mobile or stationary clients. The media server 120 may receive the backup data streams from the clients 105 and 110. The data stream manager 150 on the media server 120 may partition the backup data streams into segments. In one embodiment, to avoid sending redundant data segments over the network 130, the data stream manager 150 may communicate with the deduplication engine 160 to identify the unique data segments. After querying the deduplication engine 160, the identified unique data segments may be sent to the deduplication engine 160 running on the backup server 125. From the backup server 125, the data segments may be sent to the backup storage 165.

The backup server 125 may also be used as part of a target deduplication system. A target deduplication system may also include clients 105 and 110. The backup server 125 may receive the backup data streams from the clients 105 and 110, and the data stream manager 155 may partition the backup data stream into segments. The data segments may then be processed by the deduplication engine 160. The deduplication engine 160 may remove redundant data segments before or after the data segments are sent to the backup storage 165.

Client 115 illustrates an embodiment of a client deduplication system. In this embodiment, both the data stream manager 145 and deduplication engine 140 may be present on the client 115. As shown, the client 115 is connected directly to a local backup storage 135. The data stream manager 145 may partition the backup data stream, generated by the client 115, into segments. In one embodiment, to avoid sending redundant data segments to the deduplication engine 140, the data stream manager 145 may communicate with the deduplication engine 140 to identify the unique data segments. After querying the deduplication engine 140, the identified unique data segments may then be sent to the deduplication engine 140 running on the client 115. From the client 115, the data segments may be sent to the backup storage 135.

Figure 2:
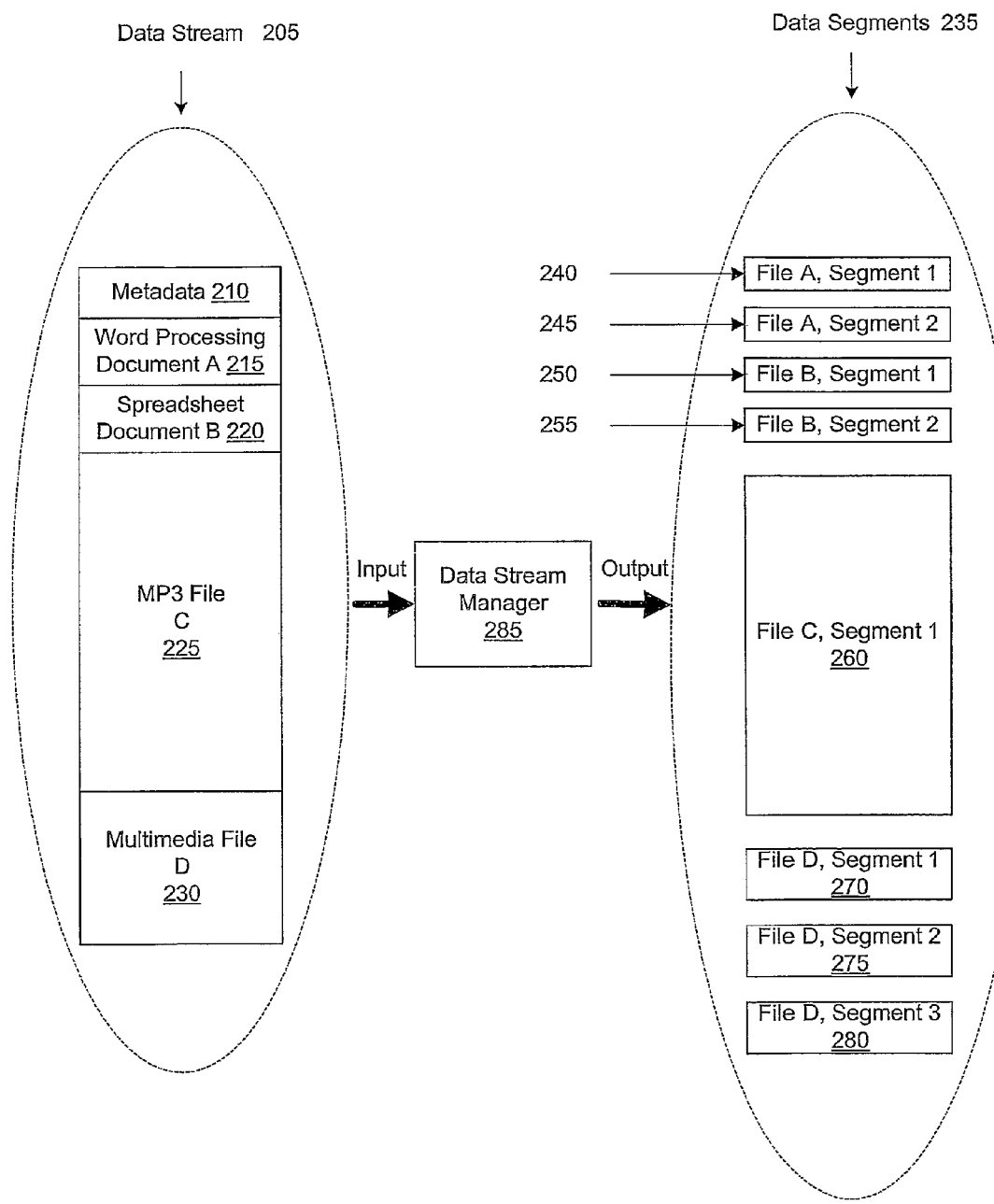
FIG. 2 illustrates one embodiment of data stream processing.

Turning now to FIG. 2, one embodiment of a data stream being processed by a data stream manager is shown. FIG. 2 depicts a data stream 205, data stream manager 285, and data segments 235 that may be generated by the data stream manager 285. In the example, data stream 205 is shown to include metadata 210 and four different files. During a backup process, or another process that generates data stream 205, a client may create the data stream and send it to the data stream manager 285. In general, the backup data stream may include a plurality of data files that are copied from an image file or a volume. For example, the backup data could include a virtual machine disk file (VMDK), a virtual hard disk (VHD), a disk image file (.V2I) created by SYMANTEC® BackupExec software products, or otherwise. The backup stream may include a .TAR archive file that further includes a VMDK file for storing the data files as a raw disk partition. In some cases, the backup data may be organized and managed in accordance with a file system, such as New Technology File System (NTFS), VERITAS® File System (VxFS), Unix File System (UFS), among others. Furthermore, a data file split into two or more data blocks may appear out of order within the stream.

In FIG. 2, the input to the data stream manager 285 is the data stream 205, which includes the metadata 210 and four files. The metadata may generally include information regarding the data/files included within the stream 205. In various embodiments, such metadata may include a file extent mapping of the data stream 205 and information indicating the types of data included. In the example shown, the four files are a word processing document A 215, a spreadsheet document B 220, an MPEG-1 Audio Layer 3 (MP3) file C 225, and a multimedia file D 230. In one embodiment, the data stream manager 285 is configured to partition the data stream 205 into data segments 235. Word processing document A 215 is partitioned into two segments, 240 and 245. Spreadsheet document B 220 is partitioned into two segments, 250 and 255. The MP3 file C 225 is placed in one segment, 260. The multimedia file D 230 is partitioned into three segments, 270, 275, and 280. In one embodiment, the data stream manager 285 may determine the file boundaries based at least in part on the metadata 210. For example, file boundaries in the data stream 205 may be determined from file extent mapping information in the metadata 210. Then, the data stream manager 285 may partition the files into segment sizes based on their file types. The segment sizes may, for example, be chosen to find a balance between maximizing the deduplication ratio and minimizing the segment count. In the example shown, segments 240, 245, 250, and 255 may correspond to one size; segment 260 may correspond to a different size; and segments 270, 275, and 280 may correspond to yet a different size.

Figure 3:
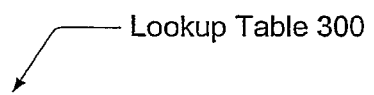
FIG. 3 illustrates one embodiment of a lookup table for selecting a segment size based on the type of data being partitioned.

FIG. 3 illustrates one embodiment of a lookup table 300 that may be used to indicate segment sizes for various file types. While a table is used in the example, other embodiments may maintain such information in other forms/formats. The data stream manager 285 (from FIG. 2) may use the lookup table 300 to determine which segment size to choose for partitioning given data. When the backup data stream received by the data stream manager 285 contains a word processing document 310, the data stream manager 285 may partition the corresponding data into segments of size 128 KB. For data from a spreadsheet file 320, the segment size used may be 16 KB. For data from an operating system file 330, the segment size used may be 64 KB. For data from an MPEG 340 file, the segment size used may be 16 MB. For data from an MP3 350 file, the segment size used may be 16 MB. For data from a Joint Photographic Experts Group (JPEG) 360 file, the segment size used may be 16 MB. For data from a database 370 file, the segment size used may be 8 KB. For data from other 380 file types, the segment size used may be 128 KB or otherwise chosen. In other embodiments, different segment sizes than the ones shown in the lookup table 300 may be used for each of the file types.

In one embodiment, metadata associated with a data stream may indicate a type of data included in the corresponding data stream. In such an embodiment, the data stream manager 285 may determine the file type of the data in the data stream by analyzing the metadata associated with the data stream. In one embodiment, the metadata corresponding to a given data stream may be prepended to the data stream. For example, the front (first received portion) of the backup data stream may contain a file system map, and the metadata may be contained inside the map. In another embodiment, the metadata may be interspersed throughout the backup data stream. In another embodiment, the metadata may be sent after the backup data stream. In another embodiment, the data stream manager may process the backup data stream to generate the metadata. Some of the necessary metadata may be present, and so the data stream manager may process the backup data stream to generate additional metadata needed to determine how to partition the data stream. In a further embodiment, a data stream generator may generate the metadata, extent mapping, and data stream, prepend the metadata and extent mapping to the data stream, and then convey the entirety to the data stream manager. The data stream generator may be configured to generate, or otherwise obtain, the specific metadata attributes and extent mapping information required by the data stream manager to partition the data stream into segments.

The metadata may include information about the data within the backup data stream such as file type, format, name, size, extent mapping, extent group information, file permissions (e.g., Read/Write, Read-Only), modification time, access control list, access creation, or otherwise.

In various embodiments, the same segment size may be used for all data from a specific type of file, with the specific type of file determined from the file type metadata. If the file type metadata is unavailable, the file type may be ascertained by looking at the file name. For example, a file with the name "Readme.doc" may be classified as a word processing document by examining the ".doc" ending to the file name. There may be other metadata attributes that can be used to determine missing metadata attributes through similar semantic hints.

Using the same segment size to partition a specific file type may increase the likelihood of finding fingerprint matches among data segments of the same file type. For example, if data from a word processing document is always partitioned into 128 kilobyte (KB) segment sizes, then finding a match is more likely since each segment is the same size. However, if such documents are broken into a variety of segment sizes, like 32, 64, 128, and 256 KB segments, then the probability of finding a matching segment decreases. For example, if a new data segment is 128 KB, and there exists a matching 128 KB chunk of data in storage that is identical to the new segment except that it is part of a 256 KB data segment, then when the deduplication engine compares fingerprints generated from the two segments, it will conclude they are not identical.

Another possible embodiment of the approaches described herein is to use a large, variable sized segment for partitioning, based on the metadata attributes of file type and file size. For example, files of type "MP3" may not deduplicate as well as other file types, i.e., segments from MP3 files rarely find a match in the fingerprint index. Therefore, it may be beneficial to create a large segment size that encompasses all of the data in the MP3 file. With a single segment, only one fingerprint is generated, and the fingerprint index increases by just one. The alternative would be to use multiple segments to store the MP3 file, and then the segment count and the fingerprint index would grow by more than one without a significant increase in the probability of finding redundant data. As an alternative, rather than using a single segment for such data, a relatively small number of segments may be used. Otherwise, for MP3 files, encompassing the entire file into one large segment may be desired. In this case, the metadata used for choosing segment size may include the file type and file size. For example, if the size of the MP3 file is 3.8 megabytes (MB), then a segment size of 3.8 MB may be used. If the size of the MP3 file is 7.4 MB, then a segment size of 7.4 MB may be chosen, and so on.

In a further embodiment, an end-user of the approaches described herein may modify the segment size for a specific type of file. For example, the user may determine that a smaller segment size would allow for more deduplication for word processing documents stored on their system. Then the user could reduce the segment size used by the data stream manager to partition word processing documents. In addition, the user may define additional file types for their system that have not been defined by the data stream manager. Also, the user may choose the segment size used for partitioning the additional file type. The lookup table 300 of FIG. 3 may be user configurable to allow the user to adjust to unique conditions on their specific storage system.

Figure 4:
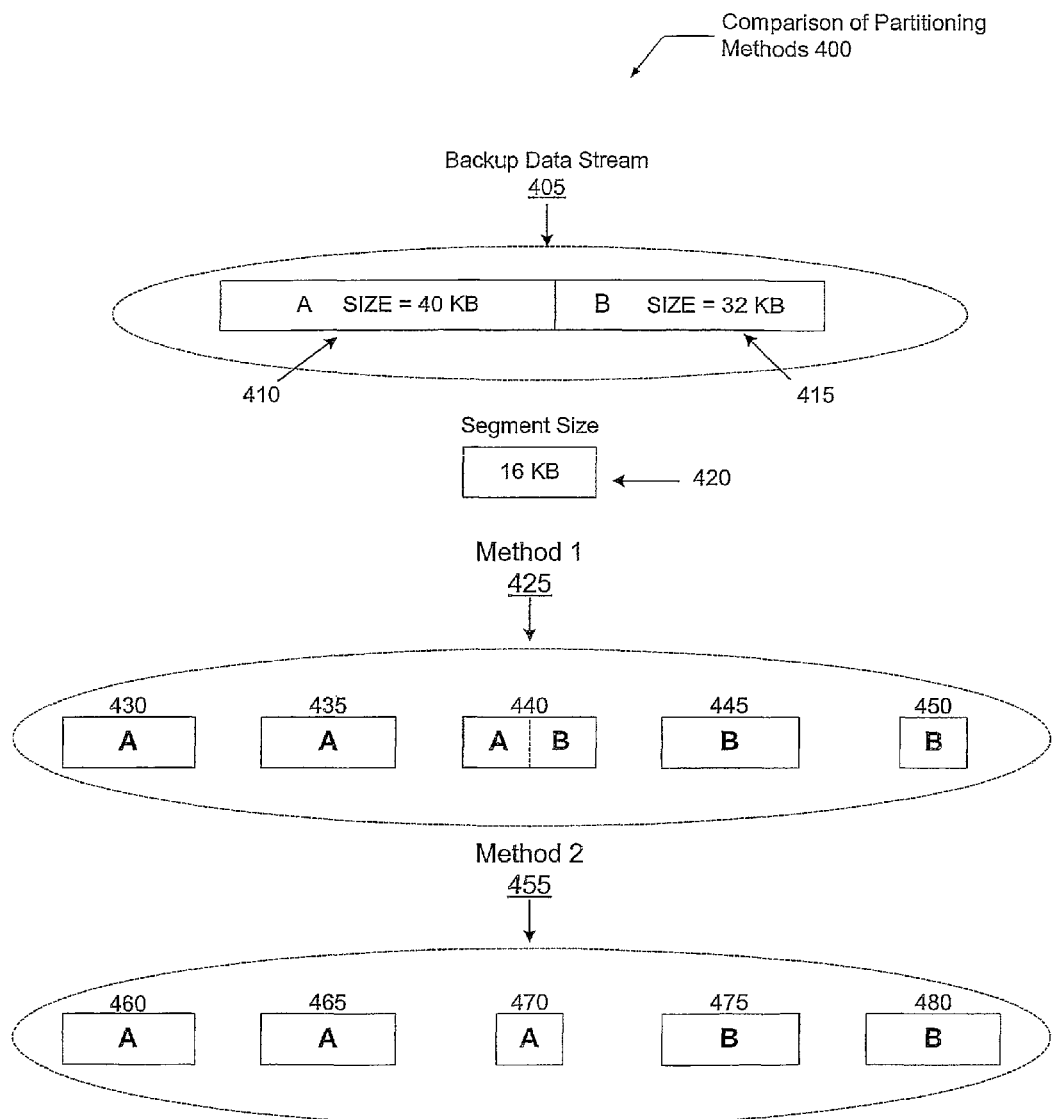
FIG. 4 illustrates a comparison of two different partitioning methods.

FIG. 4 illustrates a comparison of two different partitioning methods. In this comparison, the input to the two partitioning methods, the backup data stream 405, will be the same to highlight the differences between the two methods. As illustrated, the backup data stream 405 contains two files A 410 and B 415. The size of file A 410 is 40 KB, and the size of file B 415 is 32 KB. For this example, the data stream is being partitioned into fixed-sized segments 420 of 16 KB for both methods, except when reaching the end of a file, in which case the size of the segment may be determined by the amount of data remaining in the file. As is shown in Method 1, 425, the backup data stream 405 is broken into four segments of 16 KB size and one segment of 8 KB size. Segment 430 contains the first 16 KB of file A, segment 435 contains the next 16 KB of file A, segment 440 contains the last 8 KB of file A along with the first 8 KB of file B, segment 445 contains the next 16 KB of file B, and segment 450 contains the last 8 KB of file B.

As is shown in Method 2, 455, the backup data stream is broken into four segments of 16 KB size and one segment of 8 KB size. Segment 460 contains the first 16 KB of file A, segment 465 contains the next 16 KB of file A, segment 470 contains the last 8 KB of file A, segment 475 contains the first 16 KB of file B, and segment 480 contains the last 16 KB of file B.

Consider in this example how the segments would be deduplicated if the first 32 KB of file A 410 are equivalent to the 32 KB of file B 415. For Method 1, 425, no matching segments will be generated because the file boundary between file A and file B occurs in the middle of segment 440. So no deduplication will take place for this method. However, for Method 2, 455, two of the five segments can be discarded, because segment 460 is identical to segment 475, and segment 465 is identical to segment 480. Method 2, 455, recognizes the file boundary between A and B and stores the last 8 KB of file A in an 8 KB segment 470 so that it can store the first 16 KB of file B in its own segment 475. In this example, the recognition of the file boundary within the backup data stream allows two segments to be deduplicated and thus reduces storage utilization.

In some embodiments, the backup data streams are collections of contiguous data and may contain one or more files of data. The file or files of data stored in the data stream may correspond to data stored in an extent based file system, and the extents may or may not be in the same order in the data stream as in the original files. Using file extent mapping information to determine the partitioning of input data streams into segments may provide for improved deduplication storage methods. For additional details regarding partitioning based on file extent mapping, see U.S. patent application Ser. No. 12/338,563, filed Dec. 18, 2008, entitled "Method and Apparatus for Optimizing a De-duplication Rate for Backup Streams", which is hereby incorporated by reference in its entirety.

In one embodiment, the data stream manager may reorder the file data and/or extents prior to partitioning, with the decision to reorder based on the metadata attributes. For example, if one file is broken into non-contiguous extents within the data stream, the extents may be reordered into their original configuration so that the file can form one data segment. This reordering of extents may be done for certain types of files, with the type of file discovered by looking at the metadata. Also, the decision to reorder extents within the backup data stream prior to partitioning may be based on other metadata attributes besides just file type.

Figure 5:
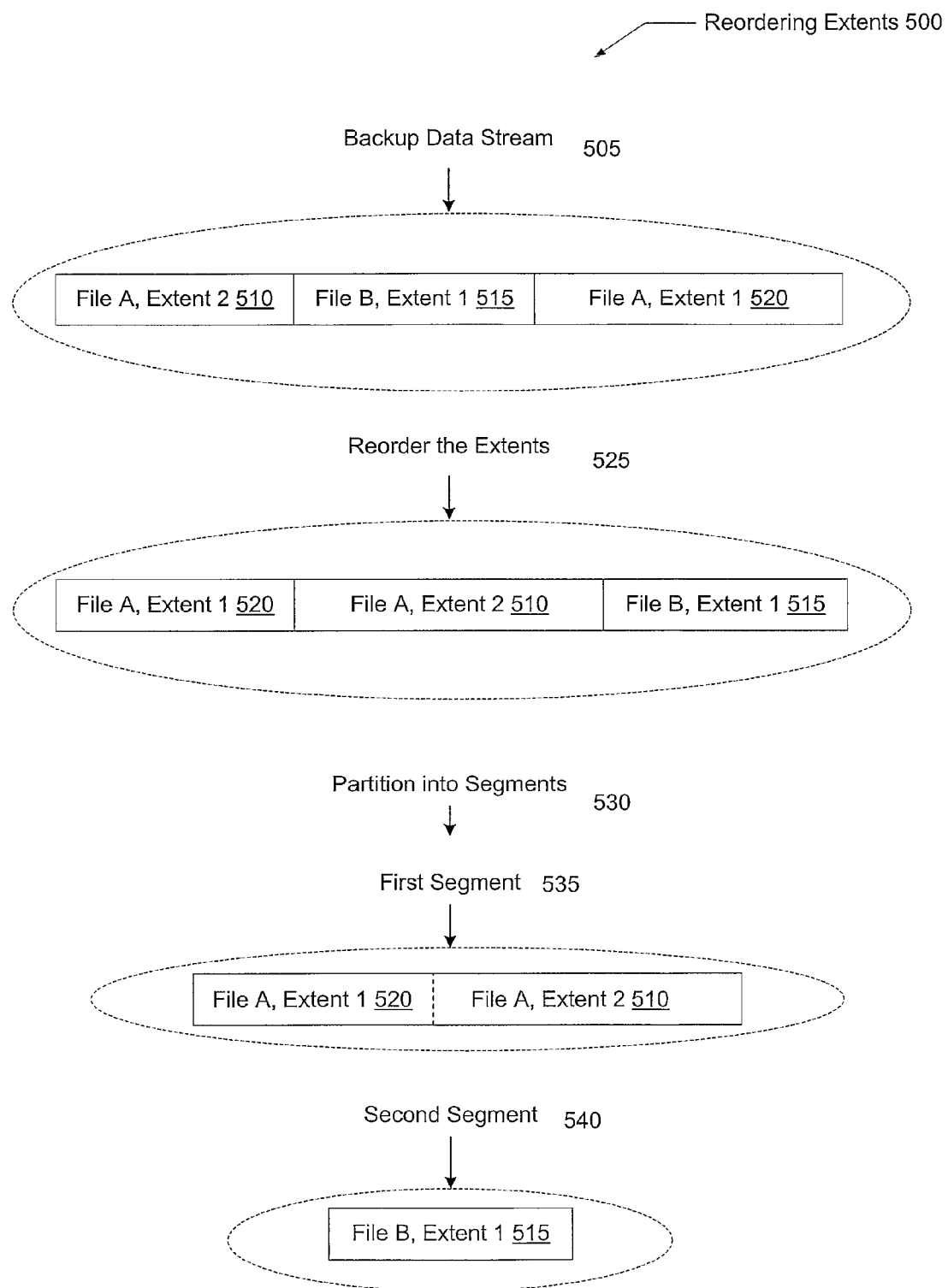
FIG. 5 illustrates one embodiment of a reordering of extents.

Turning now to FIG. 5, one embodiment of a reordering of extents 500 is shown. The backup data stream 505 contains 3 extents. The first extent 510 in the backup data stream 505 is Extent 2 from File A. The second extent 515 in the backup data stream 505 is Extent 1 from File B. The third extent 520 is Extent 1 from File A. The two extents 510 and 520 from File A are non-contiguous and out of order within the backup data stream 505, with the extent 515 from File B inserted between them. The data stream manager may reorder the extents 525 such that the two extents 520 and 510 from File A are now placed together and in the correct order, with the extent 515 from File B arranged last. Next, the data stream manager may partition the backup data stream into segments 530. The first segment 535 may contain the two extents of File A 520 and 510, while the second segment 540 may contain the one extent of File B 515.

Figure 6:
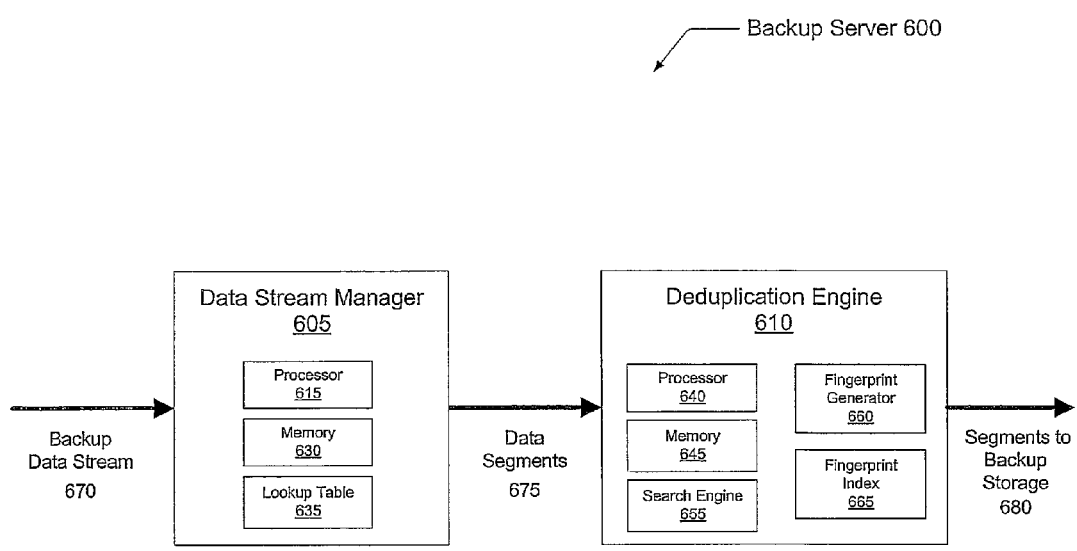
FIG. 6 illustrates one embodiment of a backup server containing a data stream manager and a deduplication engine.

FIG. 6 illustrates one embodiment of a backup server 600. The backup server 600 may contain a data stream manager 605 and a deduplication engine 610. The data stream manager 605 may contain a processor 615, memory 630, and a lookup table 635. The data stream manager 605 may receive the backup data stream 670 and store a portion of it in memory 630. Additionally, in various embodiments, the data stream manager 605 may process and partition the backup data stream 670 as it is received. The backup data stream 670 may contain metadata and an extent mapping, which may be used by the data stream manager to determine the partitioning of the data stream. The data stream manager 605 may use the extent mapping to align file boundaries with the generated data segments, as depicted in FIG. 4. The data stream manager 605 may also use the metadata to choose the segment size of the data segments. In particular, the data stream manager 605 may use the metadata to lookup the segment size stored in the lookup table 635. The data segments 675 generated by the data stream manager 605 may be output to the deduplication engine 610.

The deduplication engine 610 may receive the data segments 675 and store them in its memory 645. The deduplication engine 610 may also have a processor 640, and instructions that are executed by the processor 640 may be stored in memory 645. The deduplication engine 610 may use the fingerprint generator 660 to generate fingerprints from the received data segments 675. The deduplication engine 610 may then use the search engine 655 to search for a match to the newly generated fingerprint within the fingerprint index 665. If the search engine 655 finds a match in the fingerprint index 665, then the data segment corresponding to the generated fingerprint may be discarded. If the search engine 655 fails to find a match in the fingerprint index 665, then the corresponding data segment may be sent to the backup storage 680.

The deduplication engine 610 may be a hardware and/or software-based deduplication solution. Deduplication processing may take place before or after the data segments 675 are stored in the backup storage medium 680. In either case, the deduplication engine 610 may attempt to identify previously stored data segments containing identical data. If a match is found, reference pointers to the previously stored data blocks may be stored in a tracking database. In one embodiment, the tracking database may be used to maintain a link between the discarded segment and the identical original segment already in storage. For the deduplication post-processing method, all of the data segments may be written to the backup storage medium before the search for redundant segments is performed. In this method, when a match is found between segments, the redundant segment may be deleted from the backup storage medium.

The links between the deleted data segments and the matching identical segments in storage may be handled in a variety of ways. For example, a tracking database may be used to keep track of all the stored data segments and also track the shared segments that correspond to the deleted redundant segments. In this way, the tracking database may help recreate the data during the restoration process.

After receiving the data segments 675 from the data stream manager 605, the deduplication engine 610 may generate a fingerprint for each data segment. The fingerprint may be generated using a variety of methods, including using hash functions such as MD5, SHA-1, SHA-256, narrow hash, wide hash, weak hash, strong hash, and others. In one approach, a weak hash function may generate a small fingerprint from a data segment, and if a match is found with this small fingerprint, then a strong hash function may generate a larger fingerprint. Then, this larger fingerprint may be compared to the corresponding fingerprint from the likely match. More than one comparison between fingerprints may be required to establish a match because there is a small, nonzero probability that two segments with matching fingerprints are not identical. The fingerprints for all stored segments may be stored in a fingerprint index 665, maintained and managed by the deduplication engine 610.

In one embodiment, the deduplication engine and data stream manager may be different processes running on separate computers. In another embodiment, the deduplication engine and data stream manager may run on the same computer. In a further embodiment, the deduplication engine and data stream manager may be combined into a single software process. Also, some or all of the functions typically reserved for the data stream manager may be performed by the deduplication engine, and likewise, some or all of the functions reserved for the deduplication engine may be performed by the data stream manager. For example, in one embodiment, the data stream manager may generate fingerprints for the data segments.

In various embodiments, a deduplication engine may generate fingerprints for data segments created by the data stream manager. Also, the data stream manager may send metadata information associated with the data segments to the deduplication engine. The deduplication engine may then use the metadata to determine whether or not to create a fingerprint for each specific data segment, or it may use the metadata to decide which of a plurality of fingerprint methods to use when generating a fingerprint for each data segment. For example, the deduplication engine may decide not to generate fingerprints for spreadsheet files. The deduplication engine also may maintain separate fingerprint indices, with the fingerprints categorized into indices based on specific metadata associated with the data segments from which the fingerprints were generated. Separate fingerprint indices may allow for more efficient searching for matches.

Figure 7:
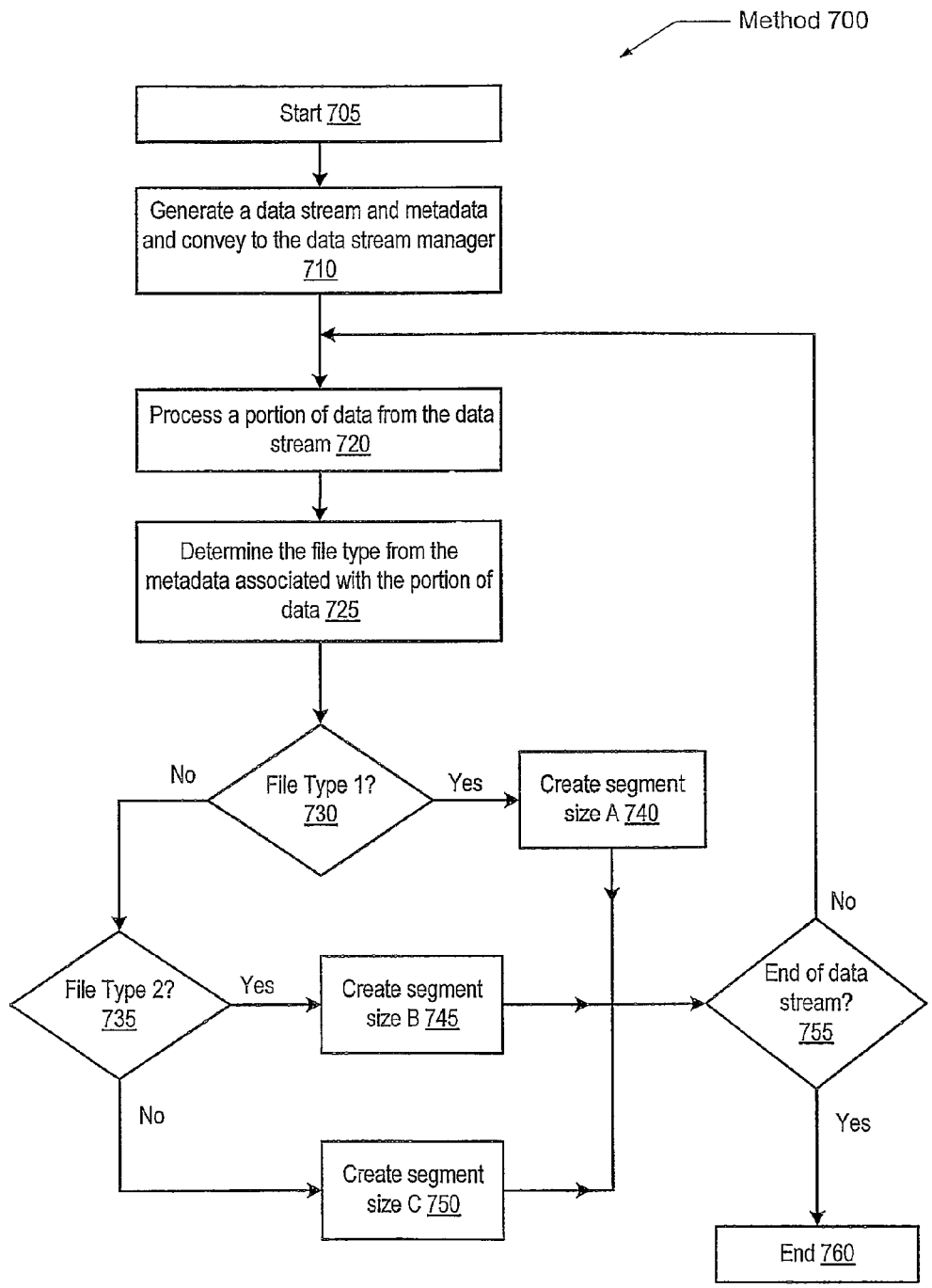
FIG. 7 illustrates a flow diagram of one embodiment of a method to partition a data stream.

FIG. 7 illustrates one embodiment of a method for partitioning a backup data stream. For purposes of discussion, the steps in this embodiment are shown in sequential order. However, some steps may occur in a different order than shown, additional steps not shown may occur, some steps may be performed concurrently, some steps may be combined with other steps, and some steps may be absent in another embodiment.

The method 700 begins in block 705. In block 710, a client or data stream generator generates a data stream and corresponding metadata and conveys the data stream and metadata to a data stream manager. The data stream manager may generally correspond to the data stream manager 285 as shown in FIG. 2. Subsequent to receiving at least some portion of the data stream, the data stream manager processes a portion of data from the data stream (block 720). Next, the data stream manager determines the file type by looking at the metadata associated with the portion of data (block 725). If the file type is file type 1 (conditional block 730), then the data stream manager partitions the data into segment size A (block 740). File type 1 refers to any given file type and may, for example, refer to the file type stored in row 1 of a lookup table, and the lookup table may be similar to the one depicted in FIG. 3. Segment size A could refer to the segment size entry in row 1 of the lookup table. If the file type is not file type 1 (conditional block 730), then if the file type is file type 2 (conditional block 735), the data stream manager partitions the data into segment size B (block 745). If the file type is not file type 2 (conditional block 735), the data stream manager partitions the data into segment size C (block 750). After a segment has been created, of size A, B, or C (blocks 740, 745, or 750), then the data stream manager checks to see if it has reached the end of the data stream (conditional block 755). If the end of the data stream has been reached, then the method ends in block 760. If there is still data remaining in the data stream, then the data stream manager returns to block 720 to process the next portion of data from the data stream.

Figure 8:
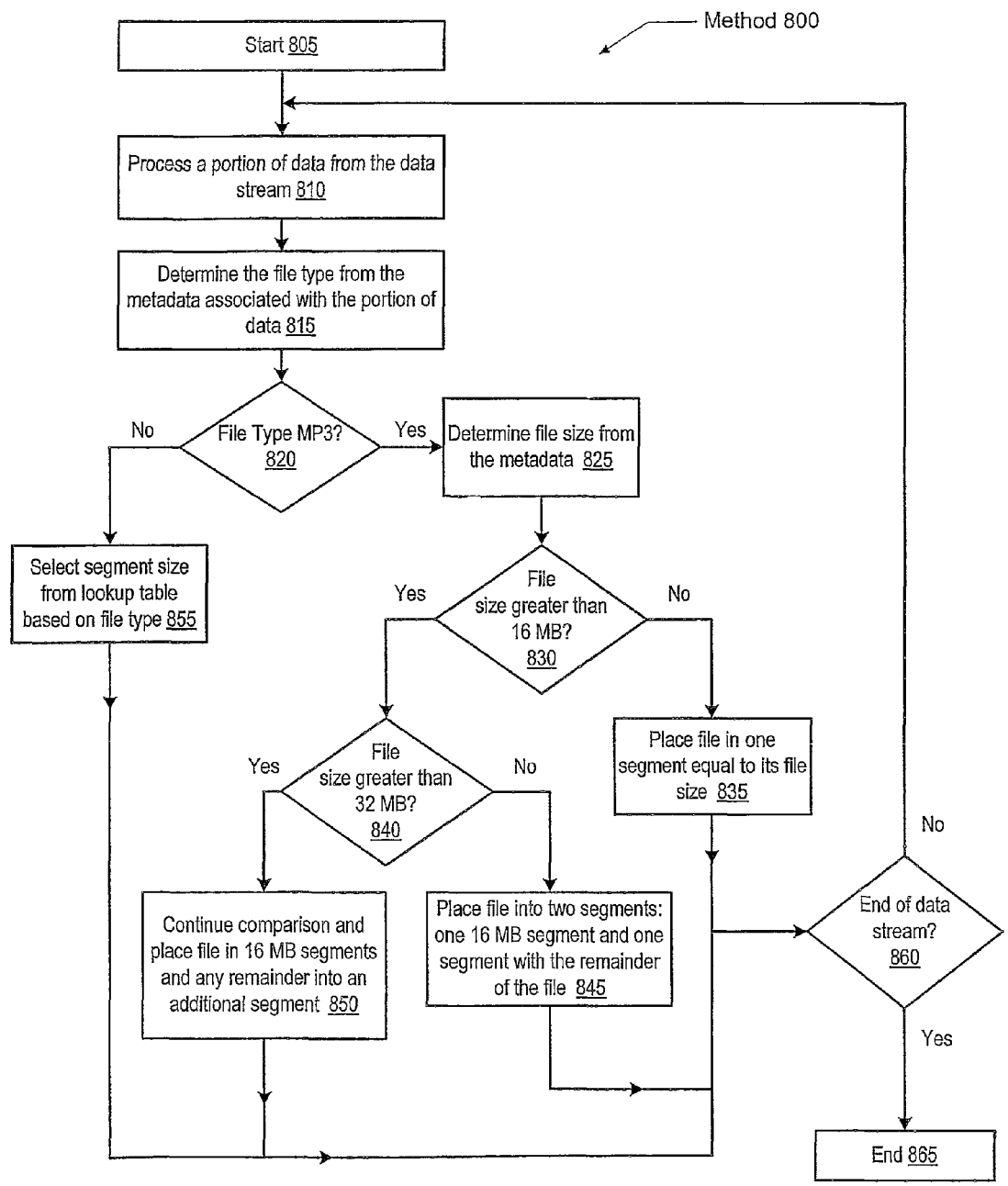
FIG. 8 illustrates a flow diagram of one embodiment of a method to partition a data stream containing an MP3 file.

Turning now to FIG. 8, one embodiment of a method 800 for partitioning a data stream containing an MP3 file is shown. As in the above, for purposes of discussion, the steps in this embodiment are shown in sequential order. However, some steps may occur in a different order than shown, additional steps not shown may occur, some steps may be performed concurrently, some steps may be combined with other steps, and some steps may be absent in another embodiment.

The method 800 begins in block 805, and then the data stream manager processes a portion of data from the data stream (block 810). Next, the data stream manager determines the file type by looking at the metadata associated with the portion of data (block 815). If the file is of type MP3 (conditional block 820), then the data stream manager determines the file size by looking at the metadata associated with the portion of data (block 825). If the file is not of type MP3

(conditional block 820), then the data stream manager selects a segment size to be used for partitioning based on the file type (block 855) by using the lookup table as shown in FIG. 3.

After the data stream manager determines the file size of the MP3 file (block 825), it compares the size of the file to 16 MB. If the file size is greater than 16 MB (conditional block 830), then the data stream manager compares the size of the file to 32 MB (conditional block 840). If the file size is not greater than 16 MB (conditional block 830), then the data stream manager places the file in a segment the same size as the size of the file (block 835). If the file size is greater than 16 MB (conditional block 830), then the data stream manager compares the size of the file to 32 MB (conditional block 840). If the file size is greater than 32 MB, then the data stream manager continues the comparison and places the MP3 file in as many 16 MB segments as are needed to store the entire file, with any remainder in a segment size which may be less than 16 MB (block 850). If the file size is not greater than 32 MB (conditional block 840), then the data stream manager places the file in two segments: the first a segment of size 16 MB, and the second storing the remainder of the file (block 845). After partitioning the file into segments, in block 835, 845, 850, or 855, the data stream manager checks to see if it has reached the end of the data stream (conditional block 860). If the end of the data stream has been reached, then the method ends in block 865. If there is still data remaining in the data stream, then the data stream manager returns to block 810 to process the next portion of data from the data stream.

Figure 9:
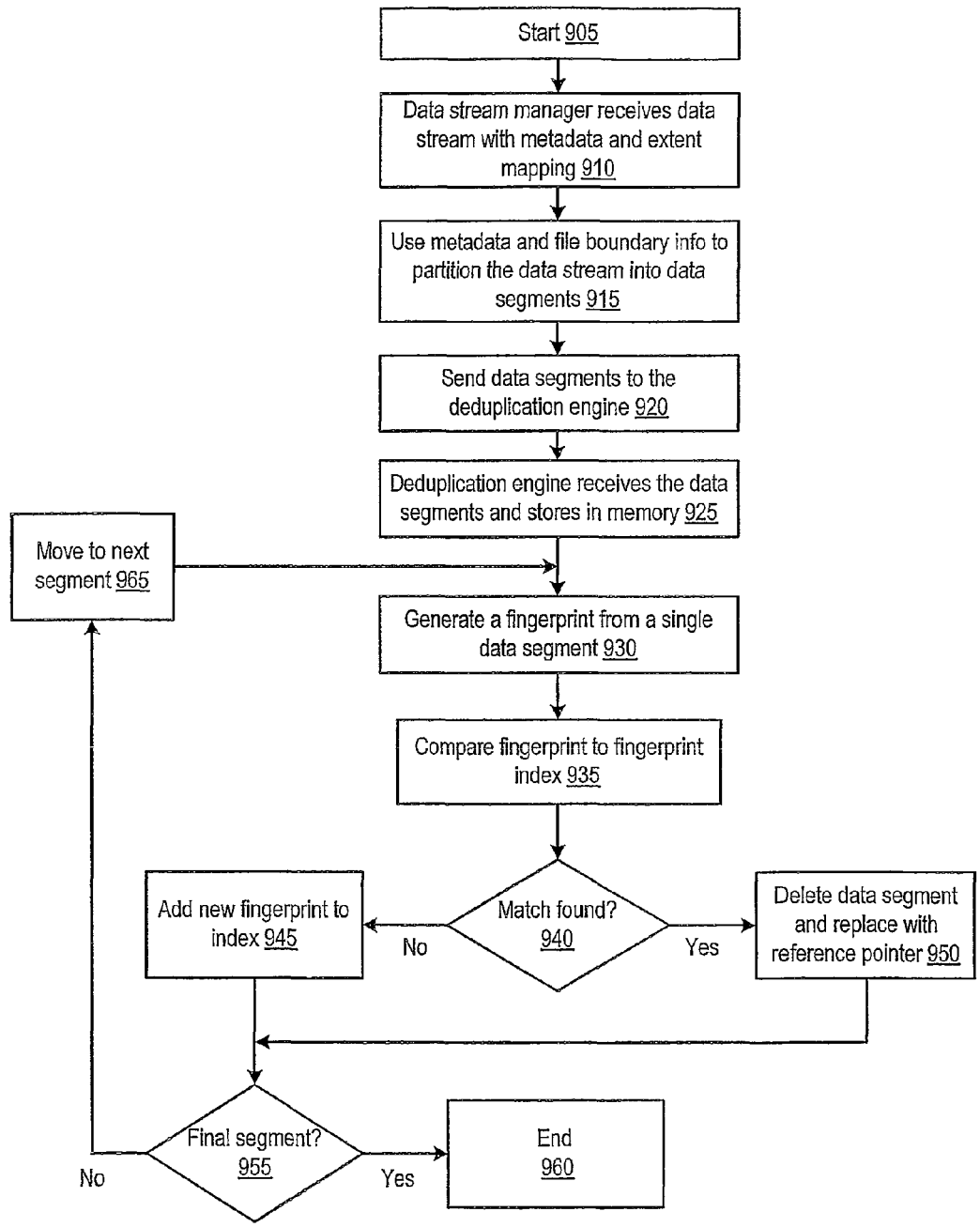
FIG. 9 illustrates one embodiment of a method for partitioning and deduplicating data.

FIG. 9 illustrates one embodiment of a method for de-duplicating a backup data stream. The method starts in block 905, and then the data stream, metadata, and file boundary information (e.g., extent mapping) are received by the data stream manager 910. Next, the data stream manager uses the metadata and file boundary information to partition the data stream into data segments 915. Then, the data stream manager sends the data segments to the deduplication engine 920. The deduplication engine receives the data segments and may temporarily store them in memory 925 while processing them. Next, the deduplication engine generates a fingerprint for a data segment 930. Then, the fingerprint is compared to the fingerprint index 935. If a match is found 940, then the data segment is already stored therein and the newly received data segment may be discarded and replaced with a reference pointer 950. If a match is not found 940, then the new fingerprint is added to the fingerprint index 945 and the data segment added to the data store. If the current data segment is the final segment 955, then the process may end 960. If the current data segment is not the final segment 955, then the process may move to the next segment 965.

In other illustrative embodiments, a computer readable storage medium storing program instructions is provided. The program instructions, when executed by a computing device, cause the computing device to perform various combinations of the operations outlined above with regard to the illustrated embodiments. In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A system for partitioning a data stream, comprising:
 a client configured to convey a data stream including at least a first type of data and a second type of data different from the first type of data, the data stream including metadata that identifies first data in the data stream as data of the first type and second data in the data stream as data of the second type and wherein the data stream comprises a plurality of extents; and
 a data stream manager, wherein the data stream manager is configured to:
  receive the data stream and said metadata corresponding to the data stream;
  select and reorder a subset of the plurality of extents based on the metadata;
  partition a first portion of the data stream into a plurality of segments using a first segment size, responsive to determining the first portion of the data stream corresponds to data of the first type; and
  partition a second portion of the data stream into a plurality of segments using a second segment size different from the first segment size, responsive to determining the second portion of the data stream corresponds to data of the second type;
  wherein at least a portion of the reordered subset of extents are combined to be included in a single segment.

2. The system as recited in claim 1, wherein the data stream manager is further configured to select from at least three different segment sizes to partition the data stream.

3. The system as recited in claim 1, wherein the metadata further comprises file boundary information, and wherein the data stream manager is further configured to use the file boundary information to partition the data stream into segments which are aligned with file boundaries.

4. The system as recited in claim 1, wherein the data stream manager is further configured to:
 determine an entire data file within the data stream is to be included within a single segment, based on the metadata associated with the data file;
 determine a plurality of locations within the data stream of extents that make up the data file, based on the extent mapping.

5. The system as recited in claim 1, wherein the first type of data and second type of data comprise at least one of word processing data, spreadsheet data, audio data, image data, or multimedia data.

6. The system as recited in claim 1, wherein the metadata further indicates a file type, name, and size.

7. A method for administering data storage, the method comprising:
 receiving a data stream including at least a first type of data and a second type of data different from the first type of data, the data stream including metadata that identifies first data in the data stream as data of the first type and second data in the data stream as data of the second type and wherein the data stream comprises a plurality of extents;

selecting and reordering a subset of the plurality of extents based on the metadata;

partitioning a first portion of the data stream into a plurality of segments using a first segment size, responsive to determining the first portion of the data stream corresponds to data of the first type; and partitioning a second portion of the data stream into a plurality of segments using a second segment size different from the first segment size, responsive to determining the second portion of the data stream corresponds to data of the second type;

wherein at least a portion of the reordered subset of extents are combined to be included in a single segment.

8. The method as recited in claim 7, further comprising selecting from at least three different segment sizes to partition the data stream.

9. The method as recited in claim 7, wherein the metadata further comprises file boundary information, and further comprising using the file boundary information to partition the data stream into segments which are aligned with file boundaries.

10. The method as recited in claim 7, further comprising:
determining an entire data file within the data stream is to be included within a single segment, based on the metadata associated with the data file;
determining a plurality of locations within the data stream of extents that make up the data file, based on the extent mapping.

11. The method as recited in claim 7, further comprising processing the data stream in order to generate the metadata associated with the data stream.

12. The method as recited in claim 7, wherein the metadata further indicates a file type, name, and size.

13. A non-transitory computer readable storage medium comprising program instructions, wherein when executed the program instructions are operable to:
receive a data stream including at least a first type of data and a second type of data different from the first type of data, the data stream including metadata that identifies first data in the data stream as data of the first type and second data in the data stream as data of the second type and wherein the data stream comprises a plurality of extents;

select and reorder a subset of the plurality of extents based on the metadata;

partition a first portion of the data stream into a plurality of segments using a first segment size, responsive to determining the first portion of the data stream corresponds to data of the first type; and partition a second portion of the data stream into a plurality of segments using a second segment size different from the first segment size, responsive to determining the second portion of the data stream corresponds to data of the second type;

wherein at least a portion of the reordered subset of extents are combined to be included in a single segment.

14. The computer readable storage medium as recited in claim 13, wherein the program instructions are further operable to select from at least three different segment sizes to partition the data stream.

15. The computer readable storage medium as recited in claim 13, wherein the metadata further comprises file boundary information, and wherein the program instructions are further operable to use the file boundary information to partition the data stream into segments which are aligned with file boundaries.

16. The computer readable storage medium as recited in claim 13, wherein the program instructions are further operable to:
determine an entire data file within the data stream is to be included within a single segment, based on the metadata associated with the data file;
determine a plurality of locations within the data stream of extents that make up the data file, based on the extent mapping.

17. The computer readable storage medium as recited in claim 13, wherein the program instructions are further operable to process the data stream in order to generate the metadata associated with the data stream.

* * * * *